US009129306B1

(12) United States Patent
Bayardo, Jr. et al.

(10) Patent No.: US 9,129,306 B1
(45) Date of Patent: Sep. 8, 2015

(54) TIE BREAKING RULES FOR CONTENT ITEM MATCHING

(71) Applicant: Google Inc., Mountain View, CA (US)

(72) Inventors: Roberto J. Bayardo, Jr., San Jose, CA (US); Uma Mahadevan, Cupertino, CA (US); Giao Nguyen, Sacramento, CA (US); Shivakumar Venkataraman, Santa Clara, CA (US); Adam I. Juda, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/463,872

(22) Filed: Aug. 20, 2014

Related U.S. Application Data

(63) Continuation of application No. 13/949,780, filed on Jul. 24, 2013, now Pat. No. 8,619,029, which is a continuation of application No. 13/208,540, filed on Aug. 12, 2011, now Pat. No. 8,515,968.

(60) Provisional application No. 61/373,768, filed on Aug. 13, 2010.

(51) Int. Cl.
G06F 7/00 (2006.01)
G06F 17/30 (2006.01)
G06Q 30/00 (2012.01)
G06Q 30/02 (2012.01)
G06F 17/00 (2006.01)

(52) U.S. Cl.
CPC ........ *G06Q 30/0256* (2013.01); *G06F 17/3053* (2013.01); *G06F 17/30864* (2013.01); *G06F 17/602* (2013.01); *G06Q 30/0273* (2013.01)

(58) Field of Classification Search
CPC .............. G06F 17/602; G06F 17/3053; G06Q 30/0273
USPC ......................................... 707/748; 705/14.4
See application file for complete search history.

(56) References Cited

U.S. PATENT DOCUMENTS

| 7,805,331 | B2 | 9/2010 | Demir |
| 7,809,605 | B2 | 10/2010 | Tonse |
| 7,885,952 | B2 | 2/2011 | Chellapilla |
| 8,069,160 | B2 | 11/2011 | Rao |
| 8,346,709 | B2 | 1/2013 | Silverman |
| 8,380,721 | B2 | 2/2013 | Attaran |
| 8,655,727 | B2 * | 2/2014 | Scholl et al. ............... 705/14.54 |
| 2005/0091106 | A1 | 4/2005 | Reller |
| 2007/0038620 | A1 | 2/2007 | Ka |
| 2007/0276800 | A1 | 11/2007 | Lee |
| 2008/0114607 | A1 | 5/2008 | Amer-Yahia |
| 2008/0154847 | A1 | 6/2008 | Chellapilla |

(Continued)

*Primary Examiner* — Charles Lu
(74) *Attorney, Agent, or Firm* — Fish & Richardson P.C.

(57) ABSTRACT

Methods, systems, and apparatus, including computer programs encoded on a computer storage medium, for selecting controlling keywords. In one aspect, a method includes determining that two or more targeting keywords for a same content item source are matched by one or more terms in a content item request, where a first targeting keyword matches the one or more terms with a more specific type of match than the second targeting keyword. If the bid associated with the second targeting keyword does not exceed the bid associated with the first targeting keyword, the first targeting keyword and the second targeting keyword are ranked based on selection scores. The targeting keywords are ranked based at least in part on the quality scores when the bid associated with the second targeting keyword does exceed the bid associated with the first targeting keyword.

20 Claims, 3 Drawing Sheets

(56) References Cited

U.S. PATENT DOCUMENTS

| | | |
|---|---|---|
| 2008/0270164 A1* | 10/2008 | Kidder et al. .................... 705/1 |
| 2008/0301033 A1 | 12/2008 | Singh |
| 2008/0306819 A1 | 12/2008 | Berkhin |
| 2009/0106103 A1 | 4/2009 | Milana |
| 2009/0216636 A1 | 8/2009 | Eliason |
| 2009/0299998 A1 | 12/2009 | Kim |
| 2009/0319517 A1 | 12/2009 | Guha |
| 2011/0184803 A1 | 7/2011 | Even-Dar |
| 2011/0191182 A1 | 8/2011 | Poirier |
| 2014/0058807 A1* | 2/2014 | Altberg et al. ............... 705/14.4 |

* cited by examiner

TIE BREAKING RULES FOR CONTENT ITEM MATCHING

CROSS-REFERENCE TO RELATED APPLICATIONS

This application is a continuation application of, and claims priority to, U.S. patent application Ser. No. 13/949,780, entitled TIE BREAKING RULES FOR CONTENT ITEM MATCHING, to inventors Bayardo et al., which was filed on Jul. 24, 2013, now U.S. Pat. No. 8,819,029, which is a continuation and claims priority to, U.S. patent application Ser. No. 13/208,540, entitled TIE BREAKING RULES FOR CONTENT ITEM MATCHING, to inventors Bayardo et al., which was filed on Aug. 12, 2011, now U.S. Pat. No. 8,515,968, and which claims the benefit under 35 U.S.C. §119(e) of U.S. Patent Application No. 61/373,768, entitled TIE BREAKING RULES FOR CONTENT ITEM MATCHING, filed Aug. 13, 2010, which are incorporated herein by reference in their entirety.

BACKGROUND

This document relates to content presentation.

The Internet enables access to a wide variety of resources. For example, video, audio, webpages directed to particular subject matter, news articles, images, and other resources are accessible over the Internet. The wide variety of resources that are accessible over the Internet has enabled opportunities for content distributors to provide targeted content items to users. Content items are units of content (e.g., individual files or a set of files) that are presented in resources (e.g., web pages). An advertisement is an example of a content item that advertisers can target for presentation with particular resources. An advertisement can be targeted for presentation with specific resources and/or resources that are determined to match specified targeting criteria, such as targeting keywords.

For example, an advertisement for a florist can be associated with the targeting keywords "red flowers" and "pink flowers." Advertisements can be selected for presentation when resources that are determined to be relevant to the targeting keyword are provided. For example, when an advertisement is requested to be presented with a search results page that is being provided in response to the search query "pink roses," advertisements associated with targeting keyword "pink flowers" can be provided. Similarly, advertisements that are associated with the targeting keyword "pink flowers" can be provided when advertisements are requested for presentation with a publisher's web page that includes text matching the targeting keyword "pink flowers."

Advertisers can associate targeting keywords with advertisements by providing targeting keywords to an advertisement management system that manages presentation of the advertisements. Advertisers can also associate targeting keywords with advertisements by using keyword suggestion tools or other tools that automatically generate targeting keywords for the advertisement based, for example, on content of the advertisement and/or performance of the advertisement when presented with resources relevant to a particular topic. Thus, many different targeting keywords can be associated with a particular advertisement or a group of advertisements in a same advertisement campaign.

SUMMARY

In general, one innovative aspect of the subject matter described in this specification can be embodied in methods that include the actions of receiving a content item request, the content item request specifying a phrase with which content items are to be selected; determining that two or more targeting keywords for a same content distribution campaign are matched by the phrase, the determination including determining that a first kind of match between a first targeting keyword and the phrase is different than a second kind of match between a second targeting keyword and the phrase, the first kind of match being a more specific match than the second kind of match; determining whether a bid associated with the second targeting keyword exceeds a bid associated with the first targeting keyword; in response to determining that the bid associated with the second targeting keyword does not exceed the bid associated with the first targeting keyword, ranking the first targeting keyword and the second targeting keyword based on a selection scores for each of the targeting keywords, the selection score for each targeting keyword being computed based on a bid and a quality score associated with the targeting keyword; in response to determining that the bid associated with the second targeting keyword exceeds the bid associated with the first targeting keyword, ranking the targeting keywords based at least in part on the quality score associated with each of the targeting keywords; selecting, as a controlling keyword, a highest ranking keyword; and providing data associated with the highest ranking keyword. Other embodiments of this aspect include corresponding systems, apparatus, and computer programs, configured to perform the actions of the methods, encoded on computer storage devices.

These and other embodiments can each optionally include one or more of the following features. The first kind of match can be an exact match and the second kind of match can be a phrase match, broad match, or expanded match. The first kind of match can be a phrase match and the second kind of match can be a broad match or expanded match. The first kind of match can be a broad match and the second kind of match can be expanded match.

The content distribution campaign can be an advertisement management campaign. The first targeting keyword can control distribution of one or more different advertisements in the advertisement management campaign, and the second targeting keyword can control distribution of one or more different advertisements in the advertisement management campaign. Providing the data can include entering the data into an auction, and further including receiving auction results specifying a winning bid; and selecting a content item responsive to the content item request based on the winning bid.

Particular embodiments of the subject matter described in this specification can be implemented so as to realize one or more of the following advantages.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
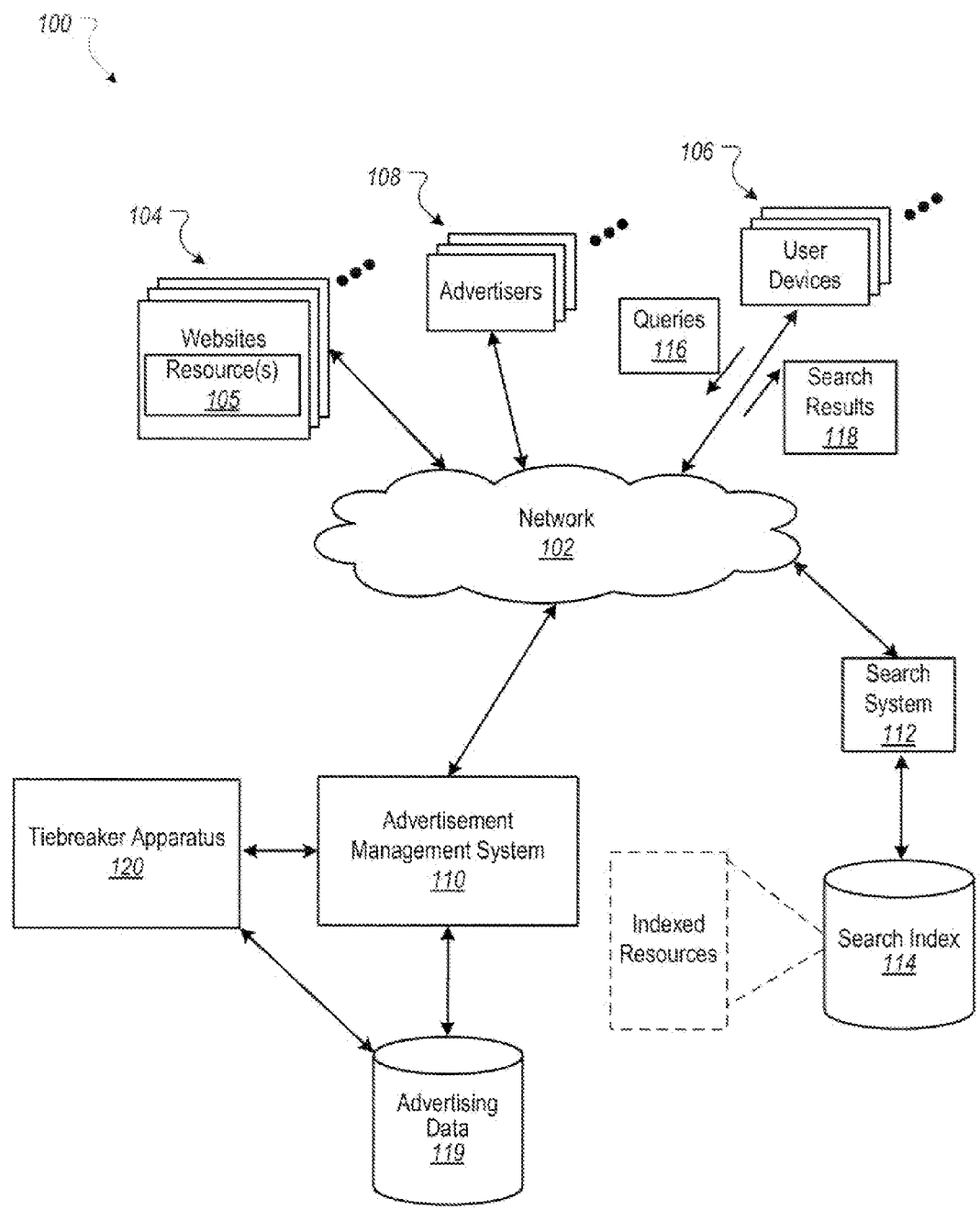
FIG. 1 is a block diagram of an example environment in which an advertisement management system manages advertising services.

Content items (e.g., online advertisements, audio files, and/or video files) are selected for presentation in response to a content item request based, in part, on targeting keywords that are used to control distribution of the content items. For example, an advertiser (or another content distributor) can specify that a particular advertisement (or group of advertisements) is eligible for distribution when either of the targeting keywords "pink flowers" or "red flowers" matches request criteria (i.e., search queries and/or resource keywords) that are specified by the content item request. As described in more detail below, each targeting keyword can be associated with a match type (e.g., expanded match, broad match, phrase match, and exact match) that is used to determine whether particular phrases (i.e., one or more words) match the targeting keyword.

For example, an advertiser may specify that the targeting keyword "red flowers" may only match the search query "red flowers," while the targeting keyword "pink flowers" may match many different search queries, including the search query "red flowers." In this example, when request criteria for a content item request matches the search query "pink flowers," the targeting keyword "pink flowers," and data (e.g., a bid and/or quality score) associated with the targeting keyword "pink flowers" will be used to determine whether the content item targeted to "pink flowers" is provided in response to the content item request.

When more than one targeting keyword for an advertisement matches request criteria specified by the content item request, generally only one of the targeting keywords is selected as a controlling keyword for the advertisement. A controlling keyword is a keyword that is used to determine whether a content item is distributed in response to a particular content item request. Continuing with the example above, both of the targeting keywords "pink flowers" and "red flowers" match the search query "red flowers." Therefore, either the targeting keyword "red flowers" or the targeting keyword "pink flowers" will be selected as the controlling keyword when only one controlling keyword is allowed.

A controlling targeting keyword is selected from a set of two or more matching keywords based on a set of "tiebreaker rules." Tiebreaker rules are a set of selection criteria that are used to determine which targeting keyword is a controlling keyword for a particular content item request. In some implementations, the tiebreaker rules specify that the controlling keyword selected based on a kind of match exists between a phrase in the content request and the matching keyword and/or based on one of bids, quality scores, and/or selection scores (i.e., a score that is computed using a bid and quality score associated with the targeting keyword) associated with the matching keywords.

The description that follows generally describes targeting keywords that are used to control distribution of advertisements that are being selected in response to an advertisement request. The description is also applicable to targeting keywords that are used to control distribution of other types of content items (e.g., video files, audio files, application scripts, or other targeted content.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment 100 can include a search system 112 that identifies the resources by crawling and indexing the resources provided by the publishers on the websites 104. Data about the resources can be indexed based on the resource with which the data are associated. The indexed and, optionally, cached copies of the resources are stored in a search index 114. Data that are associated with a resource is data that represents content included in the resource and/or metadata for the resource.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a content item request that requests advertisements to be provided with the resource 105 or search results 118. The content item request can include characteristics of the advertisement slots that are defined for the requested resource or search results page, and can be provided to the advertisement management system 110.

For example, a reference (e.g., URL) to the resource for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the content item request ("eligible advertisements"). For example, eligible advertisements can include advertisements having characteristics matching the characteristics of advertisement slots. The eligible advertisements can also be advertisements that are targeted using targeting keywords that are matched by resource keywords or search query terms 116 specified in the content item request. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. For example, an advertisement associated with the targeting keyword "pink flower" can be an eligible advertisement for an advertisement request including the resource keyword "pink flower." Similarly, the advertisement can be selected as an eligible advertisement for an advertisement request including the search query "pink flower."

A targeting keyword can also match a resource keyword or a search query 116 by having text that is identified as being relevant to a targeting keyword or search query 116 despite having different text than the targeting keyword. For example, an advertisement having the targeting keyword "pink rose" may also be selected as an eligible advertisement for a content item request including a resource keyword or search query for "pink flower" because a pink rose is a type of pink flower, and therefore, is likely to be relevant to the term "pink flower."

Advertisers can specify a level of match that is required between targeting keywords that are used to distribute their advertisements and a resource keyword and/or a search query 116. For example, an advertiser can specify a targeting keyword as an "expanded match" keyword, a "broad match" keyword, a "phrase match" keyword, or an "exact match" keyword. In some implementations, an expanded match type is automatically enabled by advertiser selection of "broad match type."

Expanded match keywords are targeting keywords that are matched by phrases (i.e., one or more words) that have been determined to be relevant to the expanded match keywords. For example, expanded match keywords can be matched by phrases that include stubs, synonyms, various alternative forms of the broad match keywords (e.g., past tense, gerunds, future tense), and/or terms that are relevant to a same topic or concept as the broad match targeting keyword (e.g., based on term clustering techniques).

Expanded match keywords can be matched by at least one phrase that does not include any of the same words as the expanded match keyword. For example, the phrase "crimson flower" can match the expanded match keyword "long stem rose," if the phrase "crimson flower," has been determined to be relevant to the targeting keyword "long stem rose."

Phrases that have been determined to be relevant to particular targeting keywords can be stored, for example, in a data store such as advertising data store 119. Each phrase that has been determined to be relevant to a particular expanded match keyword can be associated with (e.g., indexed according to or stored at a memory location assigned to) the expanded match keyword to which the phrase is relevant. When a content item request is received, phrases specified by the request criteria can be compared to the matching phrases that are associated with expanded match keywords to determine whether the received phrases match an expanded match keyword.

A phrase can be determined to be relevant to an expanded match keyword based on similarity measures between the targeting keyword and the phrase. For example, term clustering techniques, cosine similarity measures, relevance feedback data received from users and/or other similarity measures can be used to identify phrases that are relevant to a targeting keyword.

Broad match keywords are keywords that are matched by phrases (i.e., one or more words) that include one or more same words as the broad match keywords. For example, the broad match keyword "red flower," may be matched by the phrases "wild flower," "flower child," or "flowers that are red," because each of these phrases include the word "flower," which is included in the broad match keyword. Phrases can match broad match keywords irrespective of the order of the words in the phrase. For example, the phrase "flowers that are red" matches the broad match keyword "red flowers" irrespective of the fact that the word "flowers" occurs in the phrase before the word "red." Thus, broad match keywords require a more specific math than expanded match keywords.

A phrase match keyword is a targeting keyword that is matched by phrases in which words of the phrase match keyword occur in a same order as specified by the phrase match keyword. The phrases that match a phrase match keyword can include additional words that are not included in the phrase match keyword. For example, if "red rose" is designated as a phrase match keyword, the phrases "red rose" and "long stem red rose" will match the phrase match keyword because each of the phrases include the words "red" and "rose" in the order specified by the phrase match keyword. Thus, phrase match keywords require a more specific match than expanded or broad match keywords.

In some implementations, phrase match keywords are only matched by phrases in which the words of the phrase match keyword are adjacent to each other. In these implementations, the phrase "red long stem rose" will not match the phrase match keyword "red rose" because the words "red" and "rose" are not adjacent to each other in the phrase. However, the phrase "long stemmed red rose" will match the phrase match targeting keyword "red rose."

Exact match keywords are keywords that are matched by phrases that include the exact same words that occur in the exact same order as the exact match keywords. For example, the exact match keyword "red roses" is matched by the phrase "red roses," and is not matched by the phrase "long red roses" because "long red roses" includes the word "long," which is not included in the exact match keyword "red roses." Thus, exact match keywords require a more specific match than expanded, broad, or phrase match keywords.

Targeting keywords and other data associated with the distribution of advertisements can be stored in an advertising data store 119. The advertising data store 119 is a data store that stores references to advertisements, advertising campaign parameters that are used to control distribution of the advertisements, data representing conditions under which the advertisement was selected for presentation to a user, and data representing actions taken by users in response to presentation of the advertisement. For example, the advertising data store can store targeting keywords, bids, and other criteria with which eligible advertisements are selected for presentation.

Advertisers 108 submit, to the advertisement management system 110, campaign parameters (e.g., targeting keywords and corresponding bids) that are used to control distribution of advertisements (or other content items). Campaign parameters are parameters of a content distribution campaign that are used to control distribution of content for a campaign. For example, campaign parameters can include targeting keywords and corresponding bids, geographic or demographic targeting criteria, as well as other parameters corresponding to a set of advertisements.

A campaign is a content item source that includes one or more content items and associated content distribution parameters. An example campaign is an advertisement campaign that includes a set of one or more advertisements and corresponding campaign parameters (i.e., parameters that are used to control distribution of the advertisements) that are grouped together into a same advertising unit. For example, advertisements for flower arrangements can be grouped together into a same advertising campaign. Within a single campaign, subsets of the advertisements can be grouped into "ad groups." For example, an ad group in the above-referenced flower arrangements campaign can include a set of advertisements for long stemmed roses.

The campaign parameters for each ad group can be referred to as ad group parameters and the campaign parameters corresponding to each individual advertisement can be referred to as advertisement parameters. Advertisers can access the advertisement management system 110 to specify campaign parameters, ad group parameters, and/or advertisement parameters that control distribution of advertisements.

For example, the advertiser can submit the expanded match keyword "flowers" as a campaign parameter for a flower arrangements advertising campaign, such that the expanded match keyword "flowers" is used to target all advertisements in the flower arrangements campaign. Additionally, the advertiser can submit the phrase match keyword "red roses" as a group parameter for advertisements that are assigned to a "roses" advertisement group, and further submit the expanded match keyword "pink flowers" for advertisements that are grouped to a "pink flowers" advertisement group in the flower arrangements campaign. In this example, all advertisements in the flower arrangements campaign will be targeted using the expanded match keyword "flowers," while the subset of advertisements included in the advertisement group "roses" are also targeted using the phrase match keyword "red roses," and the subset of advertisements included in the "pink flowers" advertisement group will be targeted using the expanded match keyword "pink flowers."

The advertiser can specify a different bid to be associated with each of the different targeting keywords. For example, the advertiser may specify that it will pay up to $1.00 CPC (i.e., cost per click) for advertisements that are targeted (i.e., selected for presentation) using the expanded match keyword "flowers," $0.50 CPC for advertisements that are targeted using the expanded match keyword "pink flowers," and $1.50 for advertisements that are targeted using the phrase match keyword "red roses."

When the advertisement management system 110 receives a content item request, the advertisement management system 110 selects eligible advertisements that are responsive to the content item request by selecting advertisements having targeting keywords that match phrases that are specified by request criteria in the content item request. Once the eligible advertisements have been selected, the advertisement management system 110 obtains the bids that are associated with the targeting keywords that were used to select the eligible advertisements. In turn, the advertisement management system 110 selects advertisements to be provided in response to the content item request based on the outcome of a ranking.

If each eligible advertisement is associated with exactly one keyword that matches the phrases specified by the request criteria, then data (e.g., the bid and/or quality score) that is associated with that keyword is used to conduct the ranking. However, if an advertisement (or an advertisement group) is associated with more than one targeting keyword that matches the phrases in the request criteria, one of the targeting keywords should be selected as a controlling keyword for the advertisement (or an advertisement group or campaign) for that content item request.

The environment 100 includes a tiebreaker apparatus 120 that selects a controlling keyword for an advertisement for a particular content item request. When a content item request is received, the tiebreaker apparatus 120 (or the advertisement management system 110) can determine that at least two targeting keywords associated with a single content item source are matched by request criteria. In response to determining that the at least two targeting keywords are matched, the tiebreaker apparatus 120 determines a kind of match (i.e., a level of match) between the request criteria and each targeting keyword. For example, the tiebreaker apparatus 120 can compare each targeting keyword to the phrase specified by the request criteria to determine whether the targeting keyword exactly matches the phrase or whether the phrase and targeting keyword only match under conditions specified by the expanded, broad, or phrase match criteria described above. Table 1 provides an example set of matching keywords that match the phrase "red flowers" and the kind of match between the phrase "red roses" and the targeting keyword. Table 1 also provides example bids and quality scores that are associated with each of the matching keywords.

TABLE 1

| Matching Keyword | Kind of Match with phrase "red roses" | Bid (CPC) | Quality Score |
|---|---|---|---|
| Flowers | Expanded match | $1.00 | 20 |
| Pink Flowers | Expanded match | $2.50 | 8 |
| Red Roses | Exact match | $1.50 | 2 |

In some implementations, the tiebreaker apparatus 120 determines the kind of match between each matching keyword and the phrase irrespective of the "match type" of the targeting keyword. For example, the expanded match keyword "flowers" can be determined to have an "exact" kind of match for the phrase "flowers," even though the targeting keyword is specified as an expanded match keyword.

Once the kind of match between each matching targeting keyword and the phrase has been determined, the tiebreaker apparatus 120 uses a set of tiebreaker rules to determine which of the targeting keywords should be selected as the controlling keyword. In some implementations, the tiebreaker rules specify rules for selecting a controlling keyword when two matching keywords each have a different kind of match with the phrase. For example, the tiebreaker rules can specify that a more specific matching keyword (i.e., a matching keyword that matches the phrase under a more specific match type) should generally be selected as the controlling targeting keyword over a less specific matching keyword (i.e., a targeting keyword that only matches the phrase using a less specific match type). For example, assuming that the three matching keywords of Table 1 are each associated with a same advertisement campaign, the targeting keyword "red roses" would be selected as the controlling keyword based solely on the kind of match.

In some implementations, the tiebreaker rules can specify that the selection of the controlling keyword should be based, in part, on the bids that are associated with the matching keywords. In these implementations, the tiebreaker rules can specify that a less specific matching keyword is eligible to be selected as the controlling keyword when the less specific matching keyword has a bid that is less than or equal the bid for a more specific matching keyword. For example, referring again to Table 1, the matching keyword "flowers" is eligible to be selected as the controlling keyword because "flowers" is associated with a bid that is lower than the $1.50 bid that has been specified for the matching keyword "red roses." Note that the matching keyword "red roses" is still eligible to be the controlling keyword because it has the highest kind of match (i.e., exact match) of the three matching keywords.

When less specific matching keywords are eligible to be selected as the controlling keyword, the tiebreaker apparatus 120 can rank the matching keywords based on a selection score. As described above, the selection score is a score that is computed using a bid and quality score that are associated with the matching keyword. In some implementations, the quality score is a measure of the quality of the advertisements that are targeted using the matching keyword. The quality score can be computed based on a click-through-rate of advertisements that have been targeted using the matching keyword, content of the advertisements that are targeted using the matching keyword, user feedback regarding the advertisements, and/or other measures of quality (e.g., quality of landing pages linked to by the advertisement).

The tiebreaker apparatus 120 can compute the selection score for each matching keyword as a product of the bid and the quality score that are associated with the matching keyword (i.e., selection score=bid*quality score). For example, with reference to Table 1, the selection score for the matching keyword "flowers" is 20 (i.e., 1*20) and the selection score for the matching keyword "red roses" is 3.0 (i.e., 1.5*2.0). In this example, the matching keyword "flowers" is the highest ranking matching keyword with a selection score of 20. Therefore, the tiebreaker apparatus 120 can select the matching keyword flowers as the controlling keyword.

In some implementations, the tiebreaker rules can specify that less specific matching keywords that have a higher bid than a more specific matching keyword can be selected as the controlling keyword when the less specific matching keyword has a quality score that is higher than the more specific matching keyword. In these implementations, the tiebreaker apparatus 120 can generate an adjusted bid for the less specific matching keyword so that the less specific matching keyword associated with a bid that does not exceed that of the more specific matching keyword. For example, the adjusted bid can be set equal to the bid of the more specific matching keyword or to a value that is less than the bid of the more specific matching keyword. Referring again to Table 1, the tiebreaker apparatus 120 can assign an adjusted bid of $1.50 to the "pink flowers" keyword (i.e., a less specific matching keyword) so that the adjusted bid is equal to the bid associated with the "red roses" keyword (i.e., the more specific matching keyword).

Once the tiebreaker apparatus 120 has assigned an adjusted bid to the less specific matching keyword, the tiebreaker apparatus 120 ranks the matching keywords that are eligible to be selected as controlling keywords based on selection scores, as described above. The tiebreaker apparatus 120 selects the highest ranking matching keyword as the controlling keyword for the campaign for that content item request, and provides data (e.g., the bid and/or quality score) associated with the controlling matching keyword to the advertisement management system 110 (or another data processing apparatus) for use, for example, in conducting an auction.

Each of the techniques for selecting a controlling matching keyword described above can be used independently, or in combination with other techniques for selecting a controlling matching keyword. For example, each of the techniques described above can be used together in a single implementation. Additionally, other selection criteria can be considered when selecting a controlling targeting keyword. For example, geo-targeting information, user device information specifying whether the user device is a mobile device or a computer, language settings of the user's device, formatting information associated with advertisements, and other information can be considered when selecting a controlling matching keyword.

It is possible that two or more different matching keywords will have a same selection score. In these situations, the tiebreaker apparatus 120 can select to use a second set of tiebreaker rules to select the controlling matching keyword from among the matching keywords that have the same selection score. Examples of other tie breaker rules include a random selection for tied items, a preference for more specific matches, higher bids, etc. For example, the tiebreaker apparatus 120 can select the matching keyword that is has a highest kind of match, a matching keyword that has a highest quality score, and/or a highest bid. The tiebreaker apparatus 120 can further utilize the other selection criteria described above to select the controlling matching keyword.

Figure 2:
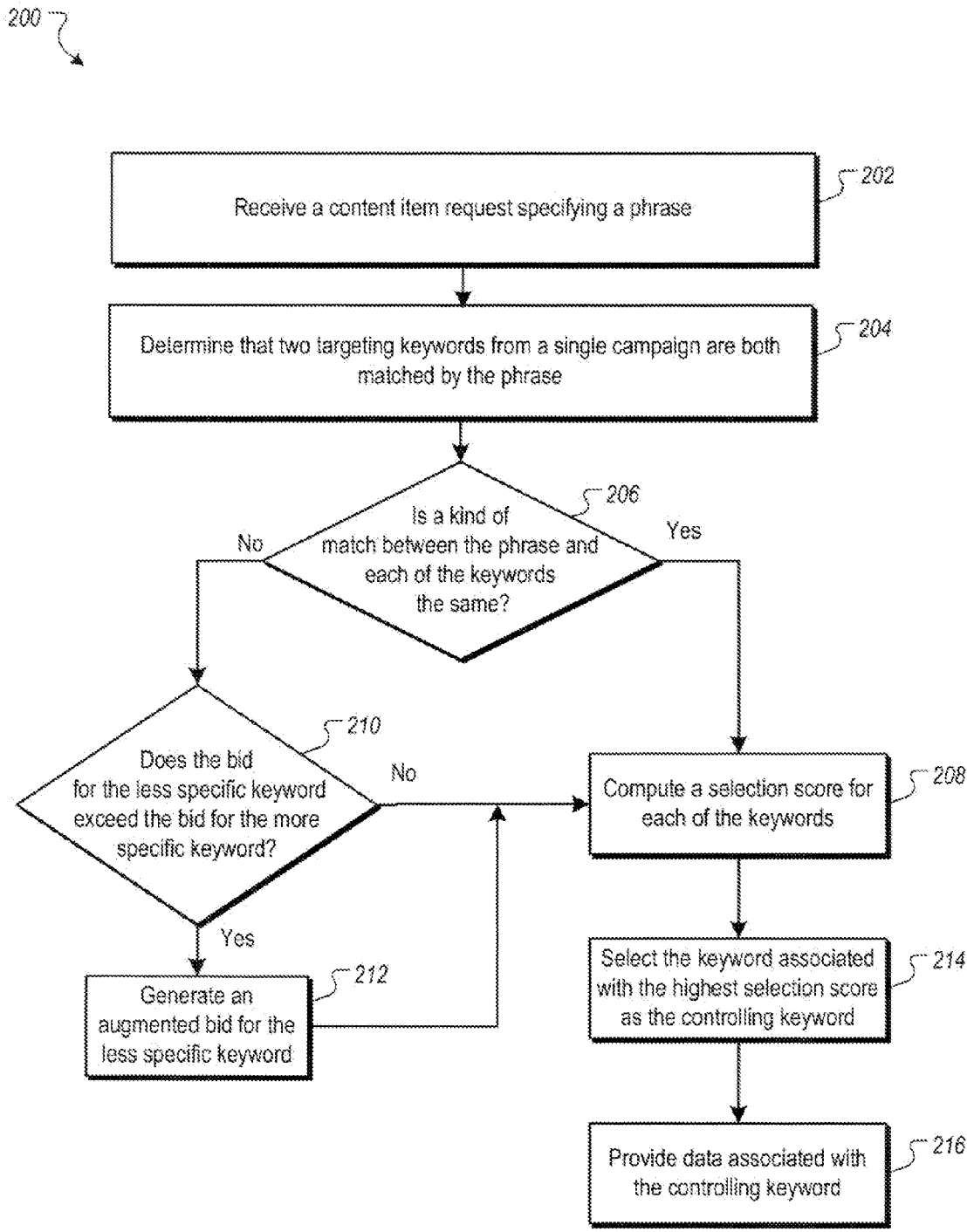
FIG. 2 is a flow chart of an example process for selecting a controlling matching keyword.

FIG. 2 is a flow chart of an example process 200 for selecting a controlling matching keyword. The process 200 is a process by which a determination is made that two or more targeting keywords from a single source (e.g., a single campaign) are both matched by one or more terms (e.g., a phrase) that is included in a request for a content item. A determination is made whether a kind of match between the one or more terms and each of the matching keywords is the same. If the kind of match is the same, a selection score is computed for the matching keywords. Otherwise, a determination is made whether the bid associated with the less specific keyword (i.e., the keyword that has a less specific match with the phrase) exceeds the bid of the more specific keyword (i.e., the keyword that has a more specific match with the phrase). If the bid for the less specific keyword does not exceed the bid for the more specific keyword, then selection scores are computed for the keywords using the bids. If the bid for the less specific keyword exceeds the bid for the more specific keyword, an augmented bid is generated for the less specific keyword prior to computing the selection scores. Once the selection scores have been computed, the keyword having the highest selection score is selected as the controlling keyword.

The process 200 can be implemented, for example, by the tiebreaker apparatus 120 and/or the advertisement management system of FIG. 1. In some implementations, the tiebreaker apparatus 120 is a data processing apparatus that includes one or more processors that are configured to perform actions of the process 200. In other implementations, a computer readable medium can include instructions that when executed by a computer cause the computer to perform actions of the process 200.

A content item request specifying a one or more terms (hereinafter referred to as a "phrase") is received (202). In some implementations, the content item request is a request for an advertisement to be presented with a search results page or a publisher's web page. The phrase specified by the content item request can be included in request criteria that provide criteria with which a content item can be selected. For example, the request criteria can specify a search query that specifies one or more query terms that were submitted by a user to whom the content item will be presented. Alternatively, the request criteria can specify a resource keyword with which a content item can be selected.

A determination is made that two targeting keywords from a single source (e.g., a single campaign) are both matched by the phrase (204). In some implementations, the determination that two targeting keywords are matched by the phrase can be made by comparing the phrase to an index of targeting keywords that are associated with a campaign. In some implementations, data can be received from a data processing apparatus (e.g., advertisement management system 110) indicating that two (or more) targeting keywords from a particular campaign each match the phrase.

A determination is made whether a kind of match (e.g., level of match or specificity of match) between the phrase and each of the keywords is the same (206). In some implementations, the determination is made by determining a most specific type of match that is possible between the phrase and each matching keyword. This determination can be made irrespective of the "match type" that has been specified for the matching keyword. For example, if the phrase specified by the content item request is "red roses," then the kind of match for the matching keyword matching keyword "red roses" is exact because the phrase "red roses" would still match the matching keyword "red roses" if the of the matching keyword "red roses" was specified as an exact match keyword.

If the match between the phrase and each of the keywords is the same, a selection score is computed for each of the keywords (208). In some implementations, the selection score for a matching keyword is computed as a function of the bid and the quality score that are associated with the matching keyword. As described with reference to FIG. 1, in some implementations, the quality score that is associated with a targeting keyword is a measure of quality of the content items in a campaign that are targeted using the targeting keyword.

For example, if the targeting keyword "red roses" is associated with only a single advertisement in a particular campaign, the quality score for the targeting keyword "red roses" can be based on a measure of quality associated with that advertisement. For example, the quality score associated with the keyword "red roses" can be based on a measure of quality of a landing page to which the advertisement links, a click-through rate for the advertisement, or other measures of quality. When a targeting keyword is associated with multiple advertisements, the quality score associated with the targeting keyword can be a function of the quality scores for the multiple advertisements.

If the match between the phrase and each of the keywords is not the same, a determination is made whether the bid for the less specific keyword exceeds the bid for the more specific keyword (210). For example, a determination can be made whether a bid associated with a matching keyword that has been determined to match the phrase using broad match criteria exceeds a matching keyword that have been determined to match the phrase using exact match targeting criteria.

If the bid for the less specific keyword does not exceed the bid for the more specific keyword, selection scores are computed for each of the keywords (208). If the bid for the less specific keyword does exceed the bid for the more specific keyword, an augmented bid is generated for the less specific keyword (212). As described above with reference to FIG. 1, the augmented bid can be set to a value that is less than or equal to the bid associated with the more specific keyword so that the augmented bid for the less specific keyword does not exceed the bid for the more specific keyword.

Once the augmented bid has been generated, the selection scores can be computed for each of the keywords (208). If an augmented bid has been generated for the less specific keyword, the selection score for the less specific keyword will be computed using the augmented bid. The keyword associated with the highest selection score is selected as the controlling keyword (214). In turn, data associated with the controlling keyword is provided (216). In some implementations, the data provided include the bid (or augmented bid) associated with the controlling keyword, a quality score associated with the controlling keyword, and/or any other data necessary to conduct an auction or otherwise select a content item to be provided in response to the content item request.

Figure 3:
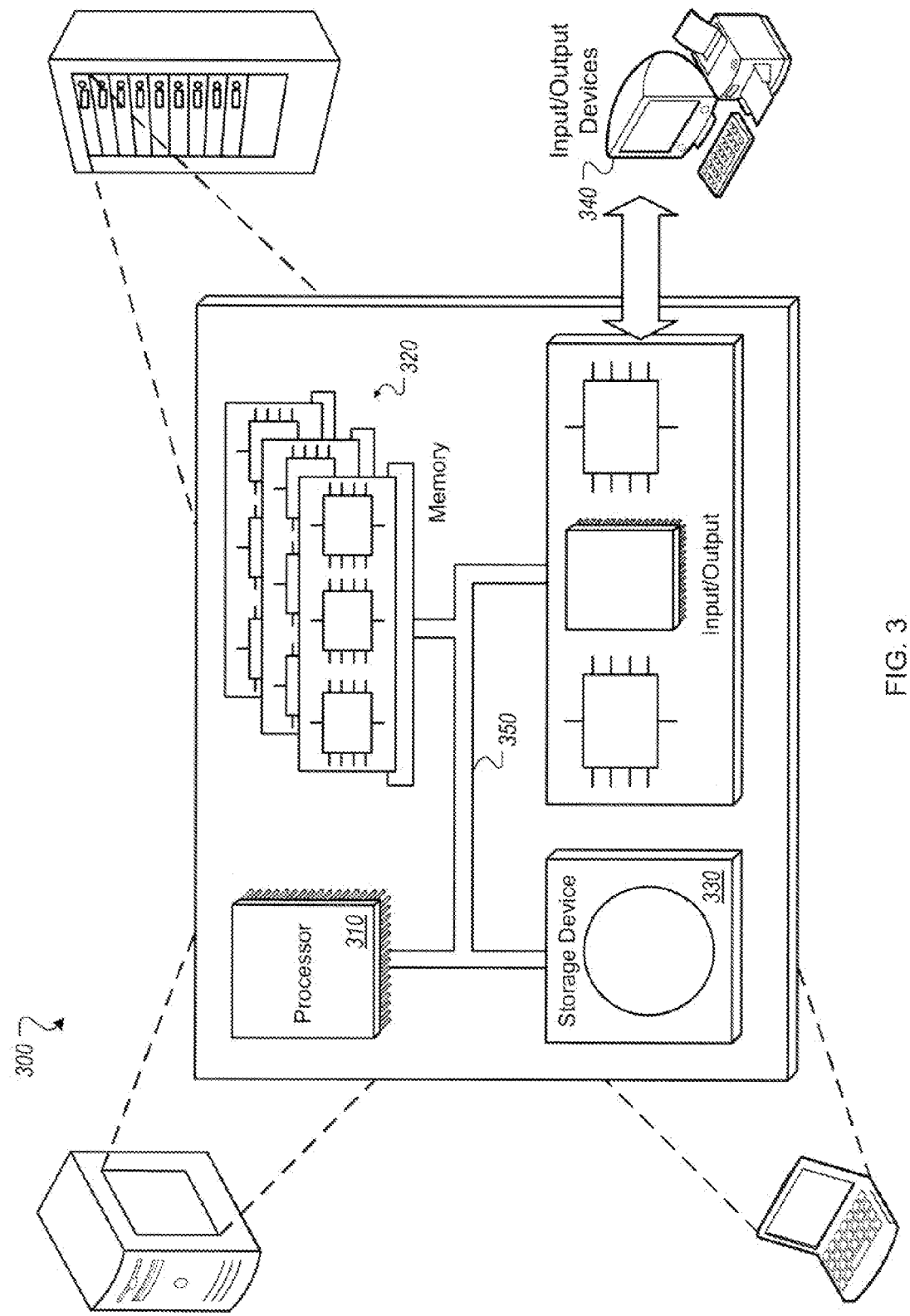
FIG. 3 is block diagram of an example computer system that can be used to select controlling keywords in response to resource requests.

FIG. 3 is block diagram of an example computer system 300 that can be used to select controlling keywords in response to resource requests. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 830. Other implementations, however, can also be used, such as mobile computing devices, mobile communication devices, set-top box television client devices, etc.

The tiebreaker apparatus 120 and/or advertisement management system 110 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The experiment subsystem 120 and/or advertisement management system 110 can be distributively implemented over a network, such as a server farm, or can be implemented in a single computer device.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying, by one or more servers, an opportunity to provide a content item having distribution criteria matching a phrase of one or more words;
   determining, by the one or more servers, that the phrase matches each of a first distribution criterion and a second distribution criterion that are used to distribute content for a given content sponsor;
   determining, by the one or more servers, that a first match between the first distribution criterion and the phrase is a more specific match than a second match between the second distribution criterion and the phrase;
   determining, by the one or more servers, that the first distribution criterion is associated with a first bid that is lower than a second bid associated with the second distribution criterion;
   in response to determining that the first match is more specific that the second match and that the first bid is lower than the second bid, reducing, by the one or more servers, the second bid by a specified amount to obtain a reduced bid;
   selecting, by the one or more servers, one of the first distribution criterion or the second distribution criterion as a winning distribution criterion based, at least in part, on the first bid and the reduced second bid; and
   providing, by the one or more servers, data specifying the winning distribution criterion.

2. The method of claim 1, wherein reducing the second bid by a specified amount comprises reducing the second bid to a value that is equal to or less than the first bid.

3. The method of claim 1, further comprising:
   determining, for the first distribution criterion, a first selection score based on a mathematical combination of the first bid and a first quality score corresponding to the first distribution criterion; and
   determining, for the second distribution criterion, a second selection score based on a mathematical combination of the reduced bid and a second quality score corresponding to the second distribution criterion.

4. The method of claim 3, wherein selecting a winning distribution criterion comprises:
   comparing the first selection score to the second selection score to identify a higher selection score; and
   selecting, as the winning distribution criterions, one of the first distribution criterion or the second distribution criterion that is associated with the higher selection score.

5. The method of claim 1, further comprising distributing a content item based on the winning distribution criterion.

6. The method of claim 1, wherein determining that a first match between the first distribution criterion and the phrase is a more specific match than a second match between the second distribution criterion and the phrase comprises:
   determining that the first match is an exact match between the first distribution criterion and the phrase; and
   determining that the second match is less than an exact match between the first distribution criterion and the phrase.

7. The method of claim 6, wherein determining that the second match is less than an exact match comprises determining that the second match is a broad match type.

8. A non-transitory computer readable medium storing instructions that upon execution by one or more data processing apparatus cause the one or more data processing apparatus to perform operations comprising:
   identifying an opportunity to provide a content item having distribution criteria matching a phrase of one or more words;
   determining that the phrase matches each of a first distribution criterion and a second distribution criterion that are used to distribute content for a given content sponsor;
   determining that a first match between the first distribution criterion and the phrase is a more specific match than a second match between the second distribution criterion and the phrase;

determining that the first distribution criterion is associated with a first bid that is lower than a second bid associated with the second distribution criterion;

in response to determining that the first match is more specific that the second match and that the first bid is lower than the second bid, reducing the second bid by a specified amount to obtain a reduced bid;

selecting one of the first distribution criterion or the second distribution criterion as a winning distribution criterion based, at least in part, on the first bid and the reduced second bid; and providing data specifying the winning distribution criterion.

9. The computer readable medium of claim 8, wherein reducing the second bid by a specified amount comprises reducing the second bid to a value that is equal to or less than the first bid.

10. The computer readable medium of claim 8, wherein the instructions cause the one or more data processing apparatus to perform operations further comprising:

determining, for the first distribution criterion, a first selection score based on a mathematical combination of the first bid and a first quality score corresponding to the first distribution criterion; and determining, for the second distribution criterion, a second selection score based on a mathematical combination of the reduced bid and a second quality score corresponding to the second distribution criterion.

11. The computer readable medium of claim 10, wherein selecting a winning distribution criterion comprises:

comparing the first selection score to the second selection score to identify a higher selection score; and selecting, as the winning distribution criterions, one of the first distribution criterion or the second distribution criterion that is associated with the higher selection score.

12. The computer readable medium of claim 8, wherein determining that a first match between the first distribution criterion and the phrase is a more specific match than a second match between the second distribution criterion and the phrase comprises:

determining that the first match is an exact match between the first distribution criterion and the phrase; and determining that the second match is less than an exact match between the first distribution criterion and the phrase.

13. The computer readable medium of claim 12, wherein determining that the second match is less than an exact match comprises determining that the second match is a broad match type.

14. A system comprising:

a data store storing distribution criteria for one or more content distribution campaigns and bids that are associated with the distribution criteria; and one or more data processing apparatus that interact with the data store and execute instructions that cause the one or more data processing apparatus to perform operations comprising:

identifying an opportunity to provide a content item having distribution criteria matching a phrase of one or more words;

determining that the phrase matches each of a first distribution criterion and a second distribution criterion that are used to distribute content for a given content sponsor;

determining that a first match between the first distribution criterion and the phrase is a more specific match than a second match between the second distribution criterion and the phrase;

determining that the first distribution criterion is associated with a first bid that is lower than a second bid associated with the second distribution criterion;

in response to determining that the first match is more specific that the second match and that the first bid is lower than the second bid, reducing the second bid by a specified amount to obtain a reduced bid;

selecting one of the first distribution criterion or the second distribution criterion as a winning distribution criterion based, at least in part, on the first bid and the reduced second bid; and providing data specifying the winning distribution criterion.

15. The system of claim 14, wherein reducing the second bid by a specified amount comprises reducing the second bid to a value that is equal to or less than the first bid.

16. The system of claim 14, wherein the instructions cause the one or more data processing apparatus to perform operations further comprising:

determining, for the first distribution criterion, a first selection score based on a mathematical combination of the first bid and a first quality score corresponding to the first distribution criterion; and determining, for the second distribution criterion, a second selection score based on a mathematical combination of the reduced bid and a second quality score corresponding to the second distribution criterion.

17. The system of claim 16, wherein selecting a winning distribution criterion comprises:

comparing the first selection score to the second selection score to identify a higher selection score; and selecting, as the winning distribution criterions, one of the first distribution criterion or the second distribution criterion that is associated with the higher selection score.

18. The system of claim 14, wherein determining that a first match between the first distribution criterion and the phrase is a more specific match than a second match between the second distribution criterion and the phrase comprises:

determining that the first match is an exact match between the first distribution criterion and the phrase; and determining that the second match is less than an exact match between the first distribution criterion and the phrase.

19. The system of claim 18, wherein determining that the second match is less than an exact match comprises determining that the second match is a broad match type.

20. The system of claim 14, the instructions cause the one or more data processing apparatus to perform operations further comprising distributing a content item based on the winning distribution criterion.

* * * * *